(12) United States Patent
Srivastava

(10) Patent No.: US 11,388,186 B2
(45) Date of Patent: Jul. 12, 2022

(54) METHOD AND SYSTEM TO STITCH CYBERSECURITY, MEASURE NETWORK CYBER HEALTH, GENERATE BUSINESS AND NETWORK RISKS, ENABLE REALTIME ZERO TRUST VERIFICATIONS, AND RECOMMEND ORDERED, PREDICTIVE RISK MITIGATIONS

(71) Applicant: Kumar Srivastava, Mountain View, CA (US)

(72) Inventor: Kumar Srivastava, Mountain View, CA (US)

( * ) Notice: Subject to any disclaimer, the term of this patent is extended or adjusted under 35 U.S.C. 154(b) by 256 days.

(21) Appl. No.: 16/920,682

(22) Filed: Jul. 4, 2020

(65) Prior Publication Data

US 2020/0336508 A1   Oct. 22, 2020

(51) Int. Cl.
  H04L 9/40 (2022.01)
(52) U.S. Cl.
  CPC ........ H04L 63/1433 (2013.01); H04L 63/145 (2013.01); H04L 63/1425 (2013.01)
(58) Field of Classification Search
  CPC ............. H04L 63/1433; H04L 63/1425; H04L 63/145; H04L 63/1416; H04L 43/10; G06F 16/9024
  See application file for complete search history.

(56) References Cited

U.S. PATENT DOCUMENTS

| | | | |
|---|---|---|---|
| 9,654,485 B1 * | 5/2017 | Neumann | H04L 63/1416 |
| 10,904,277 B1 * | 1/2021 | Sharifi Mehr | H04L 63/1425 |
| 11,038,905 B2 * | 6/2021 | Zadeh | H04L 63/1425 |
| 2017/0118239 A1 * | 4/2017 | Most | H04L 63/168 |
| 2018/0027006 A1 * | 1/2018 | Zimmermann | H04L 63/0227 726/11 |
| 2018/0262587 A1 * | 9/2018 | Berkovitz | H04L 67/2804 |
| 2020/0236120 A1 * | 7/2020 | Monteil | H04L 63/1416 |
| 2020/0287918 A1 * | 9/2020 | Murphy | H04L 63/1441 |
| 2020/0374298 A1 * | 11/2020 | Sirianni | G06N 20/10 |
| 2020/0401963 A1 * | 12/2020 | Matuchniak | H04L 51/04 |

OTHER PUBLICATIONS

Laleh et al., "Risk Assessment in Social Networks Based on User Anomalous Behaviors," IEEE Transactions on Dependable and Secure Computing Year: 2018 | vol. 15, Issue: 2 | Journal Article | Publisher: IEEE.*

Yang et al., "Fog Intelligence for Network Anomaly Detection," IEEE Network Year: 2020 | vol. 34, Issue: 2 | Magazine Article | Publisher: IEEE.*

* cited by examiner

*Primary Examiner* — Roderick Tolentino

(57) ABSTRACT

Disclosed is a method and a system for using techniques to stitch cybersecurity, generate network risks and predictive mitigations. The method includes collecting data from several data sources and labeling events. The method includes creating a profile for each entity observed in the data with the behavior of the profile determined through the analytical analysis of the events in which the entity participates including the transference of labels from events to the entity. One or more profiles of an organization are identified that have changed and the change is processed using specific attack sequence detection to identify one or more risks associated with each profile. The method further includes notifying one or more users associated with the one or more profiles based on the one or more risks.

20 Claims, 4 Drawing Sheets

METHOD AND SYSTEM TO STITCH CYBERSECURITY, MEASURE NETWORK CYBER HEALTH, GENERATE BUSINESS AND NETWORK RISKS, ENABLE REALTIME ZERO TRUST VERIFICATIONS, AND RECOMMEND ORDERED, PREDICTIVE RISK MITIGATIONS

FIELD OF THE INVENTION

The present invention relates generally to artificial intelligence (AI), and, more particularly, to a method and a system for using techniques to stitch cybersecurity, measure network health, generate business and network risks, enable real-time zero trust verifications and recommend ordered, predictive mitigations.

BACKGROUND

The importance of information security threat identification, analysis, management, and prevention has grown dramatically in recent years and continues to expand further. For example, with the increasing use of the Internet and electronic communication, such as e-mail, for business, personal, and entertainment purposes, efficient, safe, accurate, and reliable electronic communication is essential. Without such communications, tremendous economic and other damage can result, and the utility of electronic communication may be compromised. Effectively identifying, analyzing, and managing threats to information security is therefore critical.

Spam, piracy, hacking, phishing, and virus spreading, for example, represent important and growing threats. Unsolicited bulk e-mails, or "UBEs", can cause serious loss in many ways. In the business context, one type of UBE, unsolicited email (UCE or "spam") is distracting, annoying, wastes workers' time, and reduces productivity. It can clog or slow down networks, and spread computer viruses and pornography, leading to further complications and losses. Excessive UBEs may lead to workers disregarding actual solicited e-mail. Furthermore, there may be various types of network risks involved after phishing. For example, there is always a high possibility of stealing credentials of users and installing malwares on their user devices that can be accessed by fraud entities to access the networks and steal private and confidential data which is not desirable. In light of the above-mentioned background, there is need for a technical solution that solves the above-mentioned problems and provides a seamless mechanism for stitching cybersecurity, generating business and network risks, and predicting mitigations.

BRIEF SUMMARY

It is an objective of the present invention to provide a method and a system for using techniques to stitch cybersecurity, generate business and network risks and predictive mitigations. The method includes one or more operations that are executed by circuitry of the system or an apparatus to achieve the desired outcome. In an embodiment, the method includes collecting data from one or more sources. For example, the data may be collected from the sources such as Emails, Messages, Syslogs, Firewall logs, Web Access logs, Packet Captures, API Logs, Device Logs, Audit Logs, SaaS Application Logs, Cloud Logs, Existing Security Products Logs, Security Product Alarms and the like. The method further includes executing extensible set of algorithms that can work on all collected datasets to produce a consistent set of labels for each event i.e., the potential set of labels is the same across all data sets. Each label is associated a severity score. The method further includes detecting one or more entities in each dataset including users, hostnames, IP Addresses, Device IDs, and the like. The method further includes generating unique entities including hashed values of combinations such as IP Address+Email Address, IP Address+User Agent, DeviceID+User Agent, Hostname+ProcessID, and the like. The method further includes generating profiles for each entity by capturing and storing the a. Behavior as a timeseries series of labels generated on logs that mention, contain or reference the profile b. Behavior of the entity as a source of risk c. Behavior of the entity as a target of risk d. Relationships with other entities both inside and outside the network e. Relationships including the direction of the relationships Further, the method includes storing profiles as a timeseries that captures behavior of the entity over time. The profiles are mergeable i.e., can be generated on any server or machine and can be dispatched, collected, combined or merged into a single profile. The profiles are further analyzed for risks and a risk score is produced and generated periodically. The risk is computed both to measure the risk as a "source" of suspicious and malicious activity and as a "destination" of suspicious and malicious activity. The profiles are grouped together according to similarity, relatedness, anomalous behavior, outlier behavior, and the forecasted behavior. Profile behavior is correlated and sequenced as a sequence of labeled activity extracted from all input, disparate logs and event streams. Profile behavior is correlated and sequenced as a sequence of labeled activity. Further, one or more risks such as network risk, assets at risk, services at risk, business at risk and departments at risk are predicted using Cohorts analysis, Profile Behavior, and Risk computation. Based on the one or more risks, enterprise security policies are proactively updated and managed automatically including application policies, web access policies, communication policies, firewall policies and user entitlement policies.

The feature that enables users to act on risks identified by the system include scenarios such as but are not limited to:

1. "Active Policy Management" i.e., Web, Firewall, SaaS, and Application Policy Management.

2. "Treasure Hunt" i.e., Security analyst activities to rate automatically identified threats and/or discover new threats.

3. "Work on the right thing" i.e., Rank and order risks of the enterprise according to business at risk severity i.e. the potential impact of the risk to the enterprise business.

4. "Too many choices" i.e., Enable a prioritized action list for the security team to find, verify and mitigate network risks.

5. "Have nothing or have a list too long" i.e., Increase analyst productivity by ensuring that they always have a prioritized, sorted list of risks to investigate with recommended mitigations.

6. "Poking around, calling people" i.e., Provide a set of user ids to reach out to and talk, debug, diagnose compromise and suspicious behavior.

7. "Lot of mess" i.e., Recommend next set of actions out of a disparate set of signals, alarms, events, and logs.

8. "Slow way of operating" i.e., Enable reduction of total mitigation time by enabling analysts to focus on the most severe business risks.

9. "What is going up and what is going down, what distributions are changing" i.e., enable analysts to swiftly determine macro level and segment level changes that require further investigation, triage, and mitigations.

10. "Change life of the user" i.e., enable security analysts more control and visibility over their day to day activity and enable collaborative threat mitigation.

The system enables users to create tasks to interact and follow up to a system-detected risk. The tasks may be assigned to self or another user. The tasks may be reassigned to another user as well. Each task has a lifecycle where the task is created, the task is acted upon or dismissed, and the task is then closed. A user may view the created tasks and the assigned tasks. A manager may be allowed or given permission to view the tasks across multiple users. The tasks may be of several types. Some tasks are acted upon through an in-product workflow. Some tasks are acted upon outside the product. Other tasks do not require an action but just an acknowledgement.

The method further includes a prioritized, risk-aware security task management service. The service that enables security mitigation task management including adding/removing/editing mitigation tasks and mitigation task properties and mitigation task lifecycle management. The method further includes security notification service. The service that enables delivery of security notifications including notifications delivered through UI and/or email and notifications triggering capability. This includes creating a new security notification, deleting an old security notification, editing details of the new or old security notification, and communicating the security notification to appropriate users.

In a specific embodiment of the present invention, the system includes circuitry configured to collect data from several security data sources including data producing software and services, log collection servers and security products that generate events. The circuitry labels all events in all logs with event labels. The circuitry creates uniquely identified IDs for all entities observed in the network across the logs available. The circuitry creates a profile for each ID. The circuitry creates an individual profile, a Tuple Profile, and a network profile. The circuitry enables label transference from events to entities through temporal and spatial label aggregation. The circuitry extends the profile through generation of new behaviors that leverage raw data logs or existing profile attributes. The circuitry identifies one or more profiles of an organization that have changed or exhibited suspicious, malicious, or unexpected behavior to identify one or more risks associated with each profile. The circuitry notifies one or more users associated with the one or more profiles based on the one or more risks. The circuitry generates and delivers predictive mitigations to mitigate the one or more risks with recommendations organized for easy implementation due to customization to the sources providing the raw data. The circuitry generates and delivers protected and unprotected scenario simulation results to demonstrate impact of predictive mitigations or impact of not acting on the predictive mitigations. The profiles have multiple aspects with each aspect covering a certain aspect of behavior of the profile. The behavior of the profile includes behavior as a timeseries series of labels generated on logs containing the profile, behavior as a source of risk, behavior as a target of risk, relationships with other entities both inside and outside the network, and relationships including the direction of the relationships. The profiles are assigned labels if the profile entity is found to be interacting in an event and the event has been assigned a label. The circuitry is further configured to generate the profile where the logs are stored. The profile may be regenerated on newly arrived data or updated existing data. The circuitry is further configured to detect changes in sequence of operations for the profile as another signal of suspicion sequence and correlation of different types of activity/labels. The detection helps to reduce false alarms, review entitlements, and review usage. The detection useful to perform market basket analysis for segmenting or grouping of entities to understand entitlements, usage and expected behavior. The circuitry is further configured to facilitate a user management service that enables a user to add, remove, or edit user properties of the user. The circuitry is further configured to facilitate a user management service that enables a user to add, remove, or edit task and task properties. The circuitry is further configured to facilitate a notification service having a notification triggering capability to notify the one or more users. The one or more notifications are delivered through an email. The circuitry is further configured with a task oversight service automatically determines entities that are temporarily popular in multiple risk mitigations and risk determinations. The circuitry is further configured to analyze the one or more profiles to identify the one or more risks and calculate a risk score for each risk periodically. The circuitry is further configured to predict the one or more risks such as network risk, assets at risk, services at risk, information risk, businesses at risk and departments at risk using Cohorts analysis, Profile Behavior, and Risk computation. The network risk shows distribution of the risks by type and severity, wherein the network risk shows the total risks over time, and wherein the network risk shows change in distribution of the risks by type. The business risk includes analyzing web activity to determine which department or business unit an IP address belongs to. The asset risk includes analyzing device activity from device logs and web access logs and accordingly assets connect to services with consumer applications running on them. The service risk includes analyzing the network activity in Syslogs, Firewall log, DB log, Application log to determine services at risks. The information risk includes determining information stores such as web applications, online storage, and databases, and determine private data, financial data, customer data, and HR data to identify the associated information risks.

These and other features and advantages of the present invention will become apparent from the detailed description below, in light of the accompanying drawings.

BRIEF DESCRIPTION OF THE ACCOMPANYING DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of various examples. It is expressly understood, however, that the drawings are for the purpose of illustration and description only and are not intended as a definition of the limits of the invention. Embodiments of this invention will now be described by way of example in association with the accompanying drawings in which:

Figure 2A:
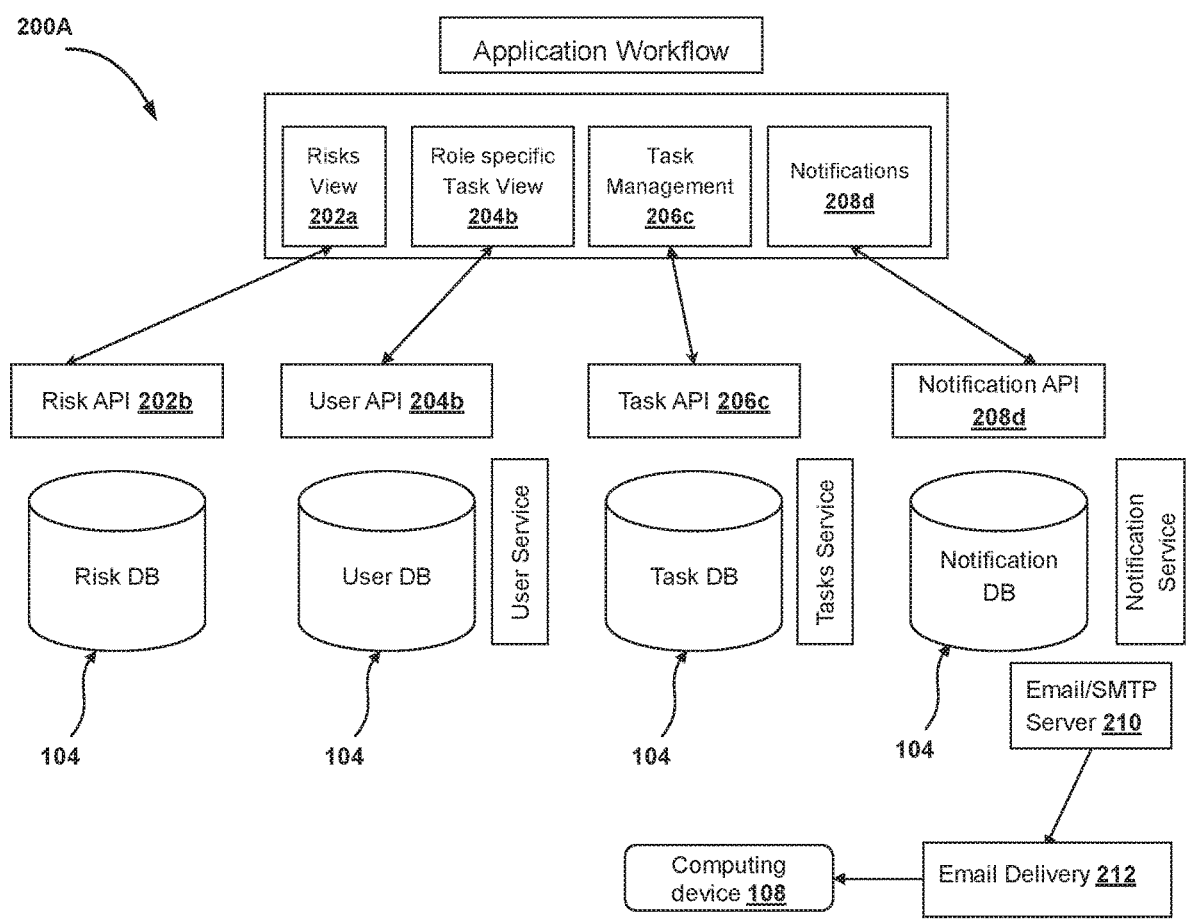
FIG. 2A shows an exemplary block diagram for illustrating high level application workflow, in accordance with an embodiment of the present invention.
Figure 2B:
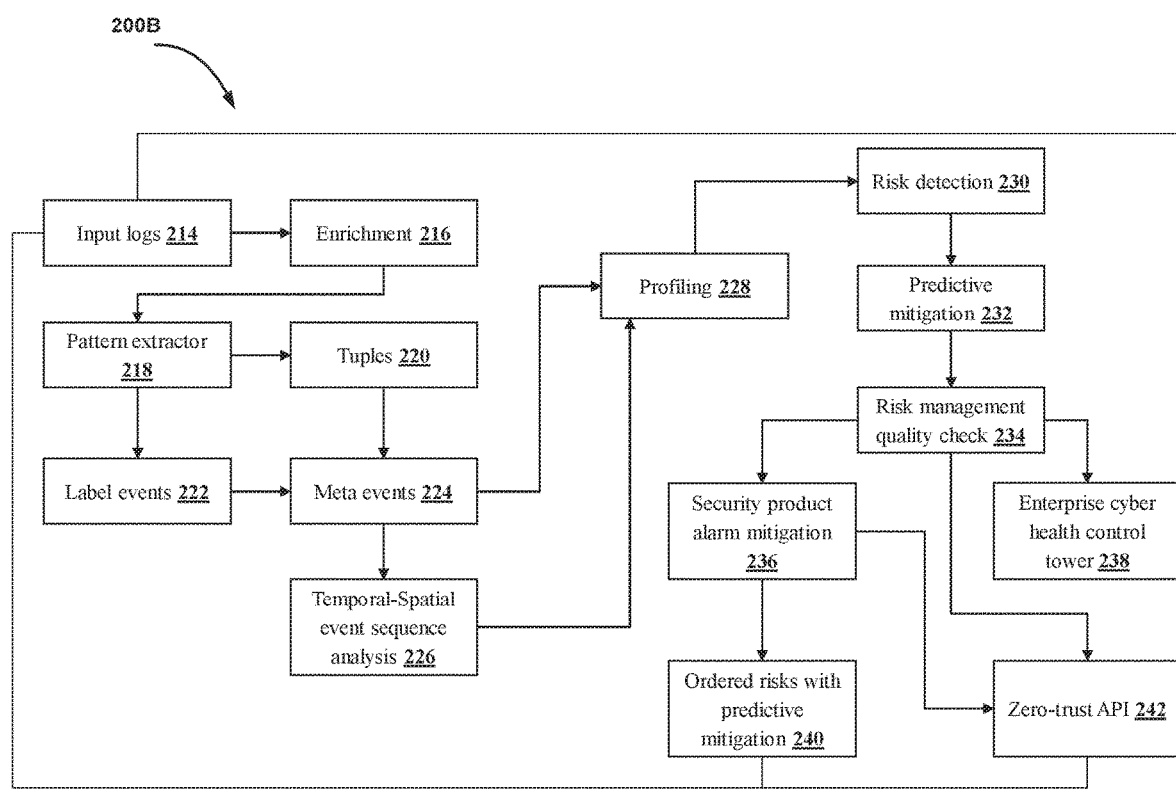
Figure 3:
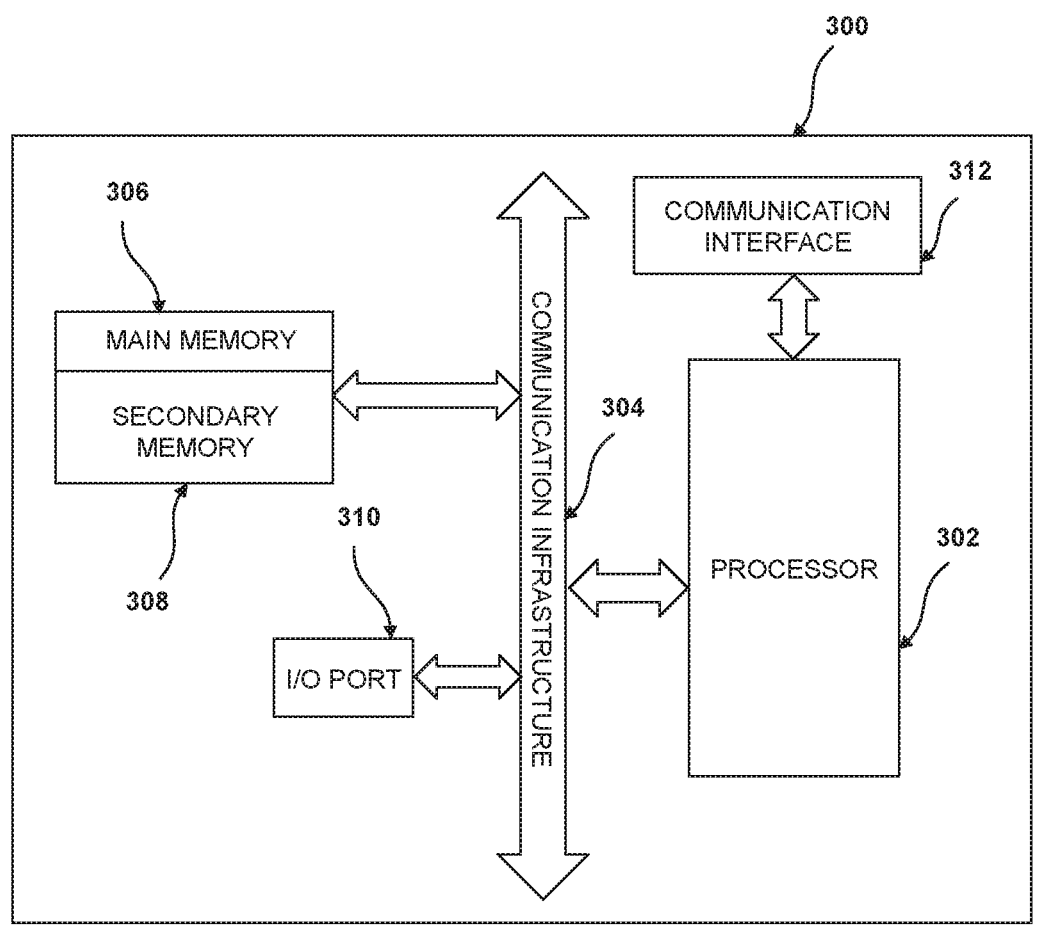

FIG. 2B shows an exemplary block diagram for illustrating high level application workflow for enabling Zero-trust API, in accordance with an embodiment of the present invention; and FIG. 3 is a block diagram that illustrates a system architecture of a computer system for stitching cybersecurity, generating business and network risks, and predicting mitigations, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components, which constitutes methods and systems for stitching cybersecurity, generating business and network risks, and predicting mitigations. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

While various exemplary embodiments of the disclosed systems and methods have been described below, it should be understood that they have been presented for purposes of example only, and not limitations. It is not exhaustive and does not limit the invention to the precise form disclosed. Modifications and variations are possible in light of the above teachings or may be acquired from practicing of the invention, without departing from the breadth or scope.

The present invention will now be described with reference to the accompanying drawings, which should be regarded as merely illustrative without restricting the scope and ambit of the present invention.

Figure 1:
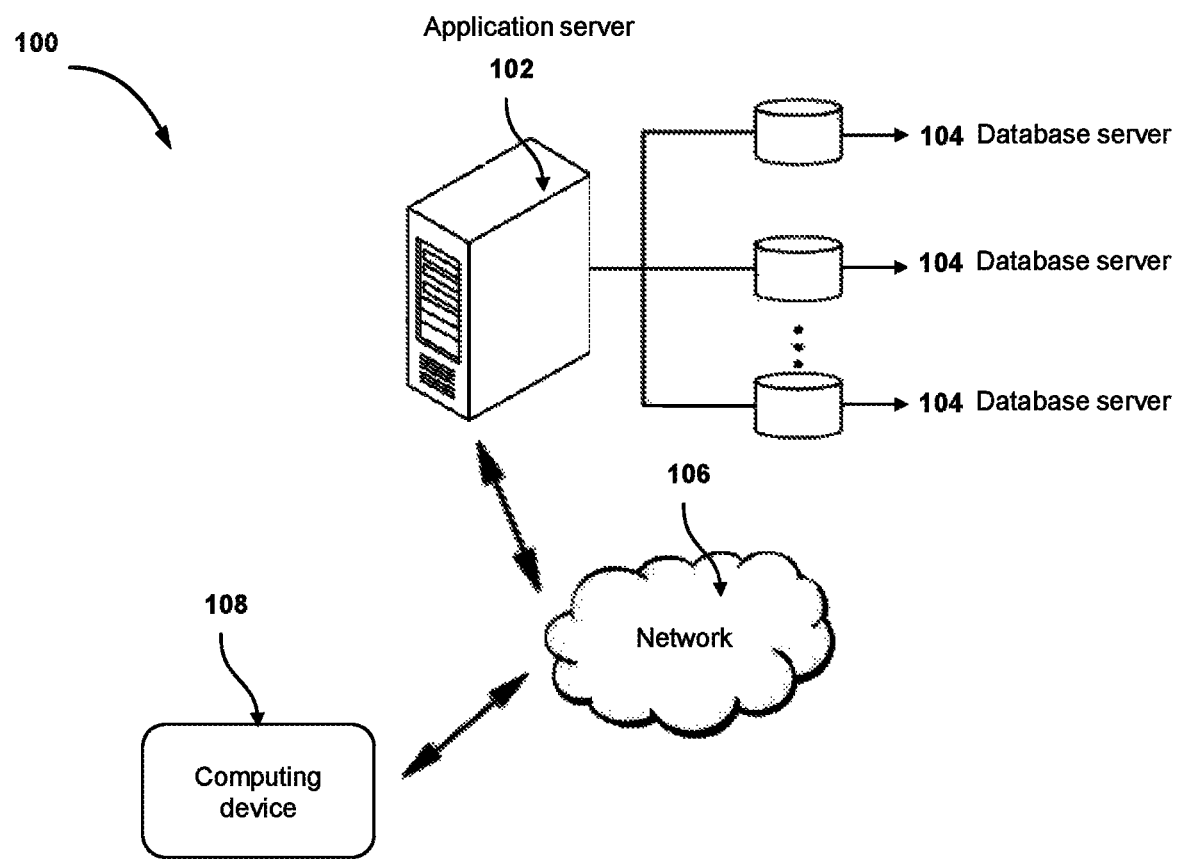
FIG. 1 is a block diagram that illustrates a system environment in which various embodiments of the present invention are practiced.

FIG. 1 is a block diagram that illustrates a system environment 100 in which various embodiments of the present invention are practiced. The system environment 100 includes an application server 102, one or more database servers such as a database server 104, and a network 106. The system environment 100 further includes one or more user computing devices associated with one or more users such as a user computing device 108 associated with a user. The application server 102 and the user computing device 108 may communicate with each other over a communication network such as the network 106. The application server 102 and the database server 104 may also communicate with each other over the same network 106 or a different network.

The application server 102 is a computing device, a software framework, or a combination thereof, that may provide a generalized approach to create the application server implementation. Various operations of the application server 102 may be dedicated to execution of procedures, such as, but are not limited to, programs, routines, or scripts stored in one or more memory units for supporting its applied applications and performing defined operations. For example, the application server 102 may be configured to collect data from one or more data sources. For example, the data may be collected from the sources such as Emails, Messages, Syslogs, Access logs, Packet Captures, API Logs, Device Logs, Audit Logs, SaaS Application, Logs, Cloud Logs, Existing Security Products Logs, and the like. The application server 102 may be further configured to execute one or more extensible sets of algorithms that can work on all collected datasets to produce a consistent set of labels for each event. The application server 102 may be further configured to detect one or more entities in each dataset including users, hostnames, IP Addresses, Device IDs, and the like. The application server 102 may be further configured to generate one or more unique entities including hashed values of combinations such as IP Address+Email Address, IP Address+User Agent, DeviceID+User Agent, Hostname+ProcessID, and the like. The application server 102 may be further configured to generate one or more profiles for each entity. The application server 102 may be further configured to store the one or more profiles as a timeseries that captures behavior over time. The profiles are mergeable i.e., can be generated on any server or machine and can be combined or merged into a single profile on the same or different machine. The profiles are further analyzed for risks and a risk score is produced and generated periodically. The risk is computed as a "source" and as a "destination". Further, the application server 102 may be further configured to predict one or more risks such as network risk, assets at risk, services at risk, businesses at risk and departments at risk using Cohorts analysis, Profile Behavior Anomalies, Outliers, Change, Volatility and Volume Variance, and Risk computation. Based on one or more risks, enterprise security policies (web, network, firewall, applications, and entitlement) are proactively updated and managed automatically. The application server 102 may be further configured to perform remediation and proactive security risk mitigation task management service and notification service. The task management service enables task management including adding, removing, or editing one or more tasks and task properties and task lifecycle management. The notification service enables delivery of notifications including notifications delivered through UI and/or email and notifications triggering capability. This includes creating a new notification, deleting an old notification, editing details of the new or old notification, and communicating the notification to appropriate users. Various other operations of the application server 102 have been described in detail in conjunction with FIGS. 2 and 3.

Examples of the application server 102 include, but are not limited to, a personal computer, a laptop, or a network of computer systems. The application server 102 may be realized through various web-based technologies such as, but not limited to, a Java web-framework, a .NET framework, a PHP (Hypertext Preprocessor) framework, or any other web-application framework. The application server 102 may operate on one or more operating systems such as Windows, Android, Unix, Ubuntu, Mac OS, or the like.

The database server 104 may include suitable logic, circuitry, interfaces, and/or code, executable by the circuitry that may be configured to perform one or more data management and storage operations such as receiving, storing, processing, and transmitting queries, data, or content. In an embodiment, the database server 104 may be a data management and storage computing device that is communicatively coupled to the application server 102 or the user computing device 108 via the network 106 to perform the one or more operations.

In an exemplary embodiment, the database server 104 may be configured to manage and store "risky" or "suspicious" data (communication, content, and activity) in optimized storage and ML optimized data structures. In an exemplary embodiment, the database server 104 may be configured to manage and store recent emails. In an exemplary embodiment, the database server 104 may be configured to manage and store the collected data from the one or more data sources. In an exemplary embodiment, the database server 104 may be configured to manage and store the one or more profiles. In an exemplary embodiment, the database server 104 may be configured to manage and store the one or more tasks. In an exemplary embodiment, the database server 104 may be configured to manage and store the one or more risks. In an exemplary embodiment, the database server 104 may be configured to manage and store the one or more notifications.

In an embodiment, the database server 104 may be configured to receive a query from the application server 102 for retrieval of the stored information. Based on the received query, the database server 104 may be configured to communicate the requested information to the application server 102. Examples of the database server 104 may include, but are not limited to, a personal computer, a laptop, or a network of computer systems.

The network 106 may include suitable logic, circuitry, interfaces, and/or code, executable by the circuitry that may be configured to transmit messages and requests between various entities, such as the application server 102, the database server 104, and the user computing device 108. Examples of the network 106 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the system environment 100 may connect to the network 106 in accordance with various wired and wireless communication protocols, such as Transmission Control Protocol and Internet Protocol (TCP/IP), User Datagram Protocol (UDP), Long Term Evolution (LTE) communication protocols, or any combination thereof.

FIG. 2A shows an exemplary block diagram 200A for illustrating high level application workflow, in accordance with an embodiment of the present invention. Firstly, the application server 102 generates or identifies the one or more risks by processing the one or more profiles of the one or more users. The application server 102 further facilitates risks view 202a of the one or more risks by means of a risk API 202b. The application server 102 further facilitates storing of the risks in a risk database 104. The application server 102 further facilitates role specific task view 204a of the one or more tasks associated with the one or more roles of the one or more users in an organization by means of a user API 204b. The application server 102 further facilitates storing of the role specific tasks in a user database 104. The application server 102 further facilitates task management 206a of the one or more tasks by means of a task API 206b. The application server 102 further facilitates storing of the one or more tasks in a task database 104. The application server 102 further facilitates notification management 208a of the one or more notifications associated with the one or more tasks or risks by means of a notification API 208b. The application server 102 further facilitates storing of the one or more notifications in a notification database 104. Further, the application server 102 manages delivery of one or more emails (i.e., email deliver 212) to one or more user-computing devices such as the computing device 108 of the user by means of an email/SMTP server 210.

FIG. 2B shows an exemplary block diagram 220B for illustrating high level application workflow for enabling Zero-trust API, in accordance with an embodiment of the present invention. In an embodiment, the application server 102 collects input logs (as shown by 214). The input logs may be collected from disparate sources. The application server 102 further performs enrichment of the input logs (as shown by 216). Here, the application server 102 ingests the input logs and enriches them by using a broad and extensible library of algorithms. This may help to enhance, enrich, and extend the data with additional metadata. Further, the pattern extractor 218 processes the data and extracts patterns of activity by analyzing the activity in each of the data sets. The application server 102 further generates tuples 220 and measures the behavior of an entity in relation to every other entity that it interacts with. The application server 102 further labels each event using a library of labeling algorithms and assigns these labels to the data (as shown by 222). The application server 102 further leverages the output of pattern matches, tuples, and labels to generate meta events (as shown by 224). The meta events offer business relevant context to the observed activity. The application server 102 further generates a temporal-spatial event sequence analysis (as shown by 226). The temporal-spatial event sequence analysis is generated by looking for a sequence of events that fit the definitions of risk over a specific period of time or specific part of the network that is connected, and generates and detects the risks. The application server 102 further performs profiling to generate profiles (as shown by 228). The application server 102 applies the "transference of labels" technique to generate the profiles for all entities and generates a graph and network of entities on the network. The application server 102 further performs risk detection (as shown by 230). The application server 102 uses various risk algorithms on the generated profiles to detect the one or more risks associated with the profiles. The application server 102 further performs predictive mitigation (as shown by 232). The application server 102 uses the risks to mitigation intelligence to determine the appropriate set of predictive mitigation strategies for each detected risk. The application server 102 further performs risk management and quality check (as shown by 234). The application server 102 leverages end user feedback and behavior to determine the quality of the risk mitigation predictions and feeds it into the system to improve the quality of risk detection, risk and threat level, and predictive mitigation generation. The application server 102 further leverages the risks generated to sort, order, and suppress alerts from other security products and accordingly perform security and alarm mitigation (as shown by 236). The application server 102 further generates a business and network risk and threat level score and exposes it through the Cyber Risk Health Control Tower 238. The application server 102 further generates and delivers the newly detected risks as a risks feed to security analysts as part of the ordered risks real time feed (as shown by 240). The application server 102 further enables the Zero-trust API to be leveraged to make real-time zero trust decisions for downstream applications.

FIG. 3 is a block diagram that illustrates a system architecture of a computer system 300 for stitching cybersecurity, generating network risks, and predicting mitigations, in accordance with an embodiment of the present invention. An embodiment of the present invention, or portions thereof, may be implemented as computer readable code on the computer system 300. In one example, the application server 102 of FIG. 1 may be implemented in the computer system 300 using hardware, software, firmware, non-transitory computer readable media having instructions stored thereon, or a combination thereof and may be implemented in one or more computer systems or other processing systems. Hardware, software, or any combination thereof may embody modules and components used to implement the various operations illustrated in the present invention. The computer system 300 includes a processor 302 that may be a special purpose or a general-purpose processing device. The processor 302 may be a single processor, multiple processors, or combinations thereof. The processor 302 may have one or more processor "cores." Further, the processor 302 may be connected to a communication infrastructure 304, such as a bus, a bridge, a message queue, the network 106, multi-core message-passing scheme, and the like. The computer system 300 further includes a main memory 306 and a secondary memory 308. Examples of the main memory 306 may include RAM, ROM, and the like. The secondary memory 308 may include a hard disk drive or a removable storage drive (not shown), such as a floppy disk drive, a magnetic tape drive, a compact disk, an optical disk drive, a flash memory, and the like. Further, the removable storage drive may read from and/or write to a removable storage device in a manner known in the art. In an embodiment, the removable storage unit may be a non-transitory computer readable recording media. The computer system 300 further includes an input/output (I/O) port 310 and a communication interface 312. The I/O port 310 includes various input and output devices that are configured to communicate with the processor 302. Examples of the input devices may include a keyboard, a mouse, a joystick, a touchscreen, a microphone, and the like. Examples of the output devices may include a display screen, a speaker, headphones, and the like. The communication interface 312 may be configured to allow data to be transferred between the computer system 300 and various devices that are communicatively coupled to the computer system 300. Examples of the communication interface 312 may include a modem, a network interface, i.e., an Ethernet card, a communications port, and the like. Data transferred via the communication interface 312 may be signals, such as electronic, electromagnetic, optical, or other signals as will be apparent to a person skilled in the art. The signals may travel via a communications channel, such as the network 106, which may be configured to transmit the signals to the various devices that are communicatively coupled to the computer system 300. Examples of the communication channel may include, but not limited to, cable, fiber optics, a phone line, a cellular phone link, a radio frequency link, a wireless link, and the like. Computer program medium and computer usable medium may refer to memories, such as the main memory 306 and the secondary memory 308, which may be a semiconductor memory such as dynamic RAMs. These computer program mediums may provide data that enables the computer system 300 to implement the present invention. In an embodiment, the present invention is implemented using a computer implemented application. The computer implemented application may be stored in a computer program product and loaded into the computer system 300 using the removable storage drive or the hard disk drive in the secondary memory 308, the I/O port 310, or the communication interface 312.

Workflow:

The application server 102 may be configured to collect data from several data sources such as network logs, access logs, API logs, device logs, service logs, cloud logs, SaaS logs, security product alarms, and the like.

The application server 102 may be further configured to convert labeling algorithms into on demand services.

The application server 102 may be further configured to label all events in all logs with event labels as shown below.

| Importance | Tag to generate | How to do that | Input attributes/data | Operation threshold | Severity (1-5) (configurable) |
|---|---|---|---|---|---|
| 1 | Brute Guessor | Larger proportion of response errors during previous 24 hours | Http response code | Larger = >55% | 5 |
| 2 | Content Quota Exceeder | Additional requests after 403 error due to content quota exceeded | Http response code | >5 | 4 |

-continued

| Importance | Tag to generate | How to do that | Input attributes/data | Operation threshold | Severity (1-5) (configurable) |
|---|---|---|---|---|---|
| 3 | Content Robber | Few OAuth sessions with large volume of traffic in a 5-minute window | Http response code | <10% | 4 |
| 4 | Content Scraper | Large number of URIs called in a 5-minute window<br>*one IP grabs the same page or pages at the same time every day.<br>*If a client browsed the site too quickly or in very predictable intervals<br>*If certain support files were never requested (favicon.ico, various linked in CSS and JS files) the client only download the main HTML<br>* If a client had a weird user agent | Count | >10 | 4 |
| 5 | Distinct OS | Multiple operating system families used in a 5-minute window | UserAgent - > OS, Browser | >1 | 4 |
| 6 | Distinct User Agent Family | Multiple user agent families used in a 5-minute window | User Agent | >1 | 4 |
| 7 | Flooder | High proportion of traffic from IP in a 5-minute window | Count | >35% | 4 |
| 8 | Guessor | Large number of response errors in a 5-minute window | Http Response Code | >5 | 4 |
| 9 | Login Guessor | High volume of traffic to few URIs in 5-minute window<br>*Consistent request with small number of packets (4:20) | Count | >25% | 5 |
| 10 | OAuth Abuser | High number of OAuth sessions with small number of user agents during previous 24 hours | Count, URI | >10 sessions <3 ua | 5 |
| 11 | OAuth Collector | High number of OAuth sessions with small number of user agent families during previous 24 hours | Count, URI | >10 sessions <2 | 5 |
| 12 | OAuth Harvestor | High number of OAuth sessions with significant traffic in a 5-minute window | Count, URI | >10 >10 traffic | 5 |
| 13 | Robot Abuser | Larger number of 403 rejection errors in past 24 hours | Http Response Code | >10 | 5 |
| 14 | Short Session | High number of short OAuth sessions | Count, URI | >10 Short = <10 minutes | 4 |
| 15 | Static Content Scraper | High proportion of response payload size from IP in a 5-minute window | Response Payload Size | >35% | 4 |
| 16 | Storm | Few high spikes in traffic in a 5-minute window | Count | >3 spikes | 3 |
| 17 | Tornado | Consistent spikes in traffic in a 5-minute window | Count | >3 | 3 |
| 18 | Tor List Rule | IP originates from a TOR project | Blacklist | NA | 5 |
| 19 | SQL Activity | Activity is classified as SQL data activity | SQL query (select, delete, update etc.) | NA | 2 |
| 20 | Login/Auth Activity | Activity is classified as Login/Auth activity | login/sign in/ auth | NA | 2 |
| 21 | File/Data Access | Activity is classified as File & Data access activity | Dropbox, box, onedrive, googledrive, gdrive, sharepoint | NA | 2 |
| 22 | Web Activity | Activity is classified as Web activity | Http traffic | NA | 2 |
| 23 | API/Service Query | Activity is classified as API & Service executions | Https traffic not returning HTML content | NA | 3 |
| 24 | Bad Protocol | Activity is classified as using risky protocols | HTTP 1.0, SSLv2, SSLv3, and TLS 1.0 TLS 1.1 | NA | 3 |
| 25 | Bad Port | Activity is classified as using bad or known malicious ports on computers | Use list of generated known bad ports | NA | 4 |

-continued

| Importance | Tag to generate | How to do that | Input attributes/data | Operation threshold | Severity (1-5) (configurable) |
|---|---|---|---|---|---|
| 26 | Bad User Agent | Activity is classified as using known bad or known malicious user agents | Use list of generated known bad user agents | NA | 4 |
| 27 | Bad URL | Activity is classified as using bad URLs | Use list of generated known bad URLs | NA | 4 |
| 28 | Bad Referrer | Activity is classified as originating from a bad referrer | Use list of generated bad referrers | NA | 4 |
| 29 | Bad IP | Activity is classified as originating from a bad IP | Use list of generated bad IPs | NA | 4 |
| 30 | Bad Fake Google Bots | Activity is classified as originating from a Fake google bot | Use list of generated fake google bots | NA | 4 |
| 31 | Error | Activity is classified as an error | HTTP Response Code is not successful | NA | 3 |
| 32 | Excessive Redirects | Activity is classified as showing multiple redirects | 300X redirect types to multiple domains | >5 | 5 |
| 33 | Bad Browser | Activity is classified as using a known bad or malicious browser | Use generated list of bad browsers | NA | 5 |
| 34 | Bad OS | Activity is classified as using a known bad operating system or malicious operating system | Use generated list of bad operating systems | NA | 5 |
| 35 | Bad ISP | Activity is classified as originating from or using a known bad ISP | Use generated list of bad ISPs | NA | 5 |
| 36 | Bad GeoLoc | Activity is classified as originating from a known bad geo location | Configurable list e.g. Russia, China, Korea | NA | 5 |
| 37 | Request URI Signature of an IP | The request URI is extracted from the request | NA | NA | 1 |
| 38 | User Signature | The User signature is extracted from the data | NA | NA | 1 |
| 39 | Application Signature | The Application signature is extracted from the data | NA | NA | 1 |
| 40 | oauth | Usage of oauth is detected | Client_id, redirect_uri, response_type, scope | NA | 1 |
| 41 | Change_Local | TO BE DONE for all ID columns present in a dataset (IP Address, Device ID, User ID, HOSTNAME, Sender Email Address) For all IP addresses, highlight if any of the attributes of the IP address have changed over time by dividing the dataset into equal parts and measuring the DISTINCT VALUES each attribute takes over the entire time period and how it changes. For example, An IP Address starts connecting to a new IP address or receives connection from a new IP address An IP Address starts connecting to new GEO locations or getting connections from new GEO locations An IP Address starts requesting new URIs An IP Address starts using new VERBS or VERBS/URI combinations | | NA | 5 |

-continued

| Importance | Tag to generate | How to do that | Input attributes/data | Operation threshold | Severity (1-5) (configurable) |
|---|---|---|---|---|---|
| | | An IP Address starts seeing a different distribution of RESPONSE CODEs. An IP Address starts seeing a more errors An IP Address starts seeing a different distribution of RESPONSE SIZE An IP Address starts seeing higher frequency or higher recency An IP Address starts seeing larger spikes (sustained periods of higher frequency or volume of recency) of traffic An IP Address changes cluster membership An IP Address changes Group membership An IP Address has a change in its time series behavior over time An IP Address becomes a member of the Top-K group An IP Address has a change in its Time behavior (time of day, day of week etc.) | | | |
| 42 | Change_Global | IPs from the same geo loc are changing their behavior as a group IPs from the same cohorts are changing their behavior as a group IPs from the same cluster are changing their behavior as a group IPs from the same group are changing their behavior as a group | | NA | 5 |
| 43 | TimeSeries Behavior- Similarity- OutlierCluster | Time series analysis detects clusters of similar behavior over time | Similar behavior over time | | 1 |
| 44 | Causal Impact of Interference | Time series analysis determines the impact of an event on another event | Given a timestamp of action, did the action change anything | | 3 |
| 45 | Time Based Window Labels | Number of flows to unique destination IP addresses inside the network in the last T seconds from the same source Number of flows from unique source IP addresses inside the network in the last T seconds to the same destination Number of flows from the source IP to the same destination port in the last T seconds host based—system calls network based—packet information Number of flows to the destination IP address using same source port in the last T seconds | | NA | 1 |
| 46 | Connection Based Labels | Number of flows to unique destination IP addresses inside the network in the last N flows from the same source Number of flows from unique source IP addresses inside the network in the last N flows to the same destination Number of flows from the source IP to the same destination port in the last N flows | | NA | 1 |

| Tag to Importance | How to do that | Input attributes/data | Operation threshold | Severity (1-5) (configurable) |
|---|---|---|---|---|
| | Number of flows to the destination IP address using same source port in the last N flows | | | |

The application server 102 may be further configured to create uniquely identified IDs for all entities observed in the network across the logs available.

The application server 102 may be further configured to create a profile for each ID. The profiles have multiple aspects with each aspect covering a certain aspect of behavior of the profile such as:

a. Behavior as source—track the origination of labeled activity from this ID
b. Behavior as target—track the reception of labeled activity from this ID
c. Relationships—Outbound—track the relationships with other IDs who this ID interacts with (initiates)
d. Relationships—Inbound—track the relationships with other IDs who this ID receives interactions from
e. Relationships—Internal—track the relationships with other Internal IDs who this ID interacts with
f. Relationships—External—track the relationships with other external IDs who this ID interacts with
g. Relationships—Outbound—Internal—track the relationships with other internal IDs who this ID interacts with
h. Relationships—Outbound—External
i. Relationships—Inbound—External
j. Relationships—Inbound—Internal
k. Source Ports—ports used to initiate activity
l. Destination Ports—ports used to receive activity
m. Source protocols—protocols used to initiate activity
n. Destination protocols—protocols used to receive activity
o. Groups—Grouping of profiles based on similarity of behavior
p. Cluster—Clustering of profiles based on clustering techniques
q. Host (data, information)—The type of data hosted by this profile that is accessed by other entities.

In an embodiment, the profiles are assigned labels if the profile entity is found to be interacting in an event and the event has been assigned a label. The profiles are labeled with a label. In addition, a label count is maintained for multiple time periods. The source of the label is also tracked i.e., which logs were used, the time of log processing, and the location (IP/Server) of the log processing.

In an embodiment, the profiles may be generated anywhere where the logs are stored. The profiles are generated with the local data that is available. This means that the profiles for the same IDs can be generated in many different locations.

In an embodiment, the profiles may be merged as well. For example, two profiles of the same ID that are generated in different locations may be merged to produce one profile of the same ID that is inclusive of all the data of the original two profiles.

In an embodiment, the profiles may be regenerated on newly arrived data or updated existing data. The profiles ensure that the logs are never double counted by detecting duplication possibilities. This is done by assigning unique IDs to all events and tracking the events used to generate every label and the corresponding profile update.

In an embodiment, the profiles may be extended through generation of new behaviors that leverage the raw data logs or existing profile attributes. Thus, the system as realized and implemented by the application server 102 should be able to identify profiles that have changed. The system should be able to cluster profiles. The system should be able to organize profiles by similarity. The system should be able to forecast labels on profiles. The profiles may be extended through the definition of new labels that incorporate data from multiple disparate log sources. The profiles are connected with each other if they are connected through common IP address or email address or hostname.

Packet Capture Input Default Schema
    Time, Source, Destination, Protocol, Info, SourcePort,
    DestinationPort, Pocket Size,
    PacketLength
For HTTP
    Info, RequestURI, RequestMethod, RequestVersion, Host, UserAgent,
    text/css, language, encoding, charset
For ICMP
    Type, Code, Data Length
{
"generatedon":date, "profiles":[
  Profile ID
    Profile Type: [from the identifier list]
    Profile Hierarchy: [if user, then which devices/hosts are used,
    which IPs are used,
    if device/host, which IPs do are used/connect to]
    Identifiers (can be one of these)
      IPAddress
      Hash (IPAddress+UserAgent)
      EmailAddress/UserName
      Hash (EmailAddress+IPAddress)
      HostName/DeviceName/ServiceName
      Hash (IPAddress+Hostname)
    number of activities from this ID
    Identifiers Constituents: [if hashed value, what are the original
    keys that were hashed]
    Source (suspicious activity is originating) Profile (e.g. deviceid,
    IP, hostname, email/IM handle, label, timestamp, eventid
      Events that was the reason for these labels (timestamp- event
      type(messaging . . . ))
      LabelID, LabelCount24Hours, LabelCount7Days,
      LabelCount30Days,
      LabelSourceEventCategory
    Destination (suspicious activity is going to) Profile (e.g.
    deviceid, IP, hostname, email/IM handle, label, timestamp, eventid
      LabelID, LabelCount24Hours, LabelCount7Days,
      LabelCount30Days,
      LabelSourceEventCategory
    Target (suspicious activity is targeting) Profile (e.g., URL,
    IP, API endpoint, email/IM handle)
      LabelID, LabelCount24Hours, LabelCount7Days,
      LabelCount30Days.
      LabelSourceEventCategory
    Relationships
      Outbound
        List of Identifiers that are accessed/communicated
        with from this ID
          [ID, count7days, TopKLabelsByCount, TopKActivity]
      Inbound
        List of Identifiers that are contacting this ID
          [ID, count7days, TopKLabelsByCount, TopKActivity]

-continued

```
Internal(inbound-outbound)
    List of Identifiers that are contacting this ID
        [ID, count7days, TopKLabelsByCount, TopKActivity]
External(inbound-outbound)
    List of Identifiers that are contacting this ID
        [ID, count7days, TopKLabelsByCount, TopKActivity]
Source Ports
    List of ports that this IP/Host has communicated from
        [portID, count7days, count1day]
Destination Ports
    List of ports that this IP/Host has been contacted from
        [portID, count7days, count1day]
Source Protocols
    List of protocols that were used to contact the entity
        [protocolID, count7days, count1day]
Destination Protocols
    List of protocols that were used by this entity
        [protocolID, count7days, count1day]
CommunicationSizeProfile e.g., packet size,
request/response size
CommunicationLengthProfile e.g., packet length,
request/response length
FrequencyProfile
RecencyProfile
ActivitySequenceProfile
ActivityTypeProfile: [Holder of Data, Holder of service,
consumer of data,
consumer of service, SQL vs. API vs. web vs. custom etc.]
AssetView
    Port numbers are assigned in various ways, based on three
    ranges:
        System Ports (0-1023), User Ports (1024-49151), and the
        Dynamic and/or Private Ports (49152-65535);
    TypeOfAsset (based on patterns)
        Consumer device (if it uses chat, streaming, gaming and
        peer to peer, remote connection)
        IT Server (admin, if not using
        chat/streaming/p2p/remoteconnection)
        Service (if it uses service-service
        Data (SQL, data)
        API (if in API log)
        Device (if in Device Log)
    AssetBehavior (based on PORTS used)
        System activity
        User activity
        Dynamic and/or Private Activity
    Asset Services & App View (based on PORTS used)
        Service, CategoriesLabels
    Asset Data Behavior (is the asset one of the following)
        Data Producer - Connects to Data Hosters/Storage (SQL or
        fileshares) at a regular pattern
        Data Hoster/Storage - Runs SQL processes and gets
        connections for many different connecting profiles (SQL,
        mySQL, PostgresSQL, MSSQL etc.)
        Data Consumer - Connects to Profiles running SQL or
        FileShares or web
        NetworkCommunicator - Uses MachineToMachine or RPC
        or other peer2peer, Service2Service
        User Communication - Uses user
        chat/streaming/videoconf/gaming ports
    Secure Traffic
        Encrypted
Data View
    Application Model
        One-Tier
        Two-Tier
        Three-Tier
Access Control
Backup
Resiliency
Vulnerability Assessment
Groups
    List of List of Identifiers who have similar labels or activity
    patterns as this profile
        Outbound
        Inbound
```

In an embodiment, the profiles are made up from labels from all 8 data sets. Each label has its source dataset information encoded in the system. The application server 102 also tracks the order/sequence in which the labels are added for a profile. This helps to track and correlate actions across different data sets by the same entity so that the profiles may be multi-faceted i.e., the system knows that a user checks his email and then goes to Box.com every day. The system may then detect changes in sequence of operations for a profile as another signal of suspicion sequence and correlation of different types of activity/labels. The system is useful to reduce false alarms, review entitlements, and review usage. The system is useful to perform market basket analysis for segmenting/grouping of entities to understand entitlements, usage and expected behavior. The system is useful to perform behavior sequence of profiles for detecting change in behavior of the users.

Profile Merging

The application server 102 may be configured to create an entity profile.

The profile may be written into DB (such as MongoDB which is a cross-platform document-oriented database program) with
   a. Profile ID, Timestamp
      i. Returns a blob of information
Next, profiling is run with another input dataset
   a. Get a new profile back
Next, when the profiling is run again
   a. Get a new profile back
Both the above steps (at paragraphs 0044 and 0045 of the present disclosure) require this flow
   a. Read old profile from DB
   b. Merge new profile with old profile (all profiles by ID)
   c. Add new merged profile into DB
Standalone Merge function
Merged Profile=MergeProfile (profile ID, old profile, new profile)

Risk Management

Here, the system needs to build three metrics
   1. Service risk—services that are critical and at most risk [Finance, HR, Customer/CRM, Operations]
   2. Asset risk—assets that are critical and at most risk
   3. Overall risk measure—% traffic not labeled—% traffic labeled with severity high labels
To do this, the system needs to be able to detect
   1. Services and assets
      a. Use the port analysis and port driven labeling to do this
   2. Risk severity
      a. Use label severity configuration (see table above)
Thereafter, expose this info as a separate API/Result
   1. ProfileTimeSeriesBehavior( )—Returns sequences of actions by profile
   2. ProfileFlat( )—returns a flattened, aggregate profile
   3. ServiceRisk( )—Returns the services that are risky, sorted
   4. AssetRisk( )—Returns the assets that are risky, sorted
   5. NetworkHealth( )—Return the overall risk measure
   6. ProfileRisk( )—Function returns the profiles that are risky, sorted
   7. ProfileChange(risk level)—Function returns the profiles that have seen movement/changes
   8. ProfileOutlier(risk level)—Function returns the profiles that are outliers
   9. ProfileRelated(risk level)—Function returns the profiles that are related to each other
   10. ProfileSimilarity(risk level)—Function returns the profiles that are similar to each other 11. ProfileAnomaly(risk level)—Function returns the profiles that are showing anomalous behavior
12. ProfileForecasts (risk level)—Function returns the profiles that are forecasted to be risky To measure the above, the system may use various KPIs Core
1. Frequency—Hyperactivity in recent data
2. Recency
3. Count
4. Severity of Labels
5. Outliers
6. Anomalies
7. RelatedCount
8. SimilarityCount
9. ForecastVariance Domain Specific
10. Risk activity (label)
11. Behavior Sequencing Since the labeling and profiling are highlighting the bad (suspicious) behaviors, what is likely to happen next is bad, but the system may:
1. Use the current IDs profiles to build a model for IDs behavior to predict what most likely upcoming next from newer IDs
2. Classify profiles (extremely dangerous—dangerous) based on a weight factor for every label. For example: bad geolocation weight=5 and flooder weight=7 then if profile have both and each happens say 2 times for 24 hours, then this profile risk factor is 36, so upcoming labels may be classified accordingly, as for example, the next Guessor labels is just Guessor because the user forgot password or because something bad is more likely happening and changes in this factor may be indicator if they are increasing or decreasing.
3. Changes in the inbound and outbound (starting to communicate with new IP) combined with bad ports or bad web request maybe an indicator of something bad.
4. If relationships are changing in a profile, then the system may check the new changes if the ID is starting to connect to high risk ID (point number 2) then most likely something bad is about to happen.
5. Check the change in communication packets profile and relations, if they are changing together this might be something bad.

Asset Management

Extract entities and classify them as assets based on behavior that shows consumer devices or behavior that displays a consumption of services and data (as opposed to hosting or delivery or distribution of services and data)

Data Management
1. Application model
    a. One-tier model
        In one-tier or single-tier model, the database and the application exist on a single system. This is common on desktop systems running a standalone database. Early Unix implementations also worked in this manner. Each user would sign on to a terminal and run a dedicated application that accessed the data.
    b. Two-tier model
        In a two-tier model, the client workstation or system runs an application that communicates with a database that is running on a different server. This is a common implementation, and it works well for many applications.
    c. Three-tier model
        The three-tier model effectively isolates the end user from the database by introducing a middle-tier server. This server accepts requests from clients, evaluates them, and sends them on to the database server for processing. The database server sends the data back to the middle-tier server, which then sends the data to the client system. This approach is becoming common today. The middle server can also control access to the database and provide additional security
2. SQL vs NoSQL
3. SAN vs. Non-SAN
4. FileSystem vs. Non-FileSystem
5. Sensitive Data
    a. Public data—Data that may be freely disclosed with public, such as customer service contact email addresses and phone numbers.
    b. Internal data—Data that has low security requirements but is not meant for public disclosure. Examples include business data like marketing research and sales phone scripts.
    c. Restricted data—Extremely sensitive internal data whose disclosure could negatively affect operations and put the organization at financial or legal risk. Restricted data requires the highest level of security protection. Examples include data protected by regulations or confidentiality agreements, such as patient health information, PII of customers or employees (e.g., Social Security numbers), and authentication data (such as user IDs and passwords).
6. Access Control
    a. Physical
    b. Technical
        i. Permissions
            1. Full Control
            2. Modify
            3. Read & Execute
            4. Read
            5. Write
        ii. Security Devices & Methods
            1. Data Loss Prevention in place
            2. Firewall in place
            3. Network Access Control in place
            4. Proxy Server in place
        iii. Device
            1. Full Disk Encryption in place
            2. Mobile device security in place
        iv. Network Segregation in place
        v. Video Surveillance in place
        vi. Locking & recycling in place
        vii. Change Management in place
        viii. Database auditing in place
        ix. Data encryption in place
    c. Administrative
        i. Education & Awareness
        ii. Employee Termination
    d. Data Backup in place
        i. Full—All data is archived.
        ii. Differential—All changes since the last full backup are archived.
        iii. Incremental—All changes since the last backup of any type are archived.
    e. Data Resiliency (RAID)
    f. Windows
        i. Disable LanMan authentication
            Ensure that all accounts have passwords, whether the account is enabled or disabled. Disable or restrict permissions on network shares. Remove all services that are not required, especially telnet and ftp, which are clear-text protocols. Enable logging for important system events.
  ii. Linux
    1. Disable unnecessary services and ports.
    2. Disable trust authentication used by the "r commands."
    3. Disable unnecessary setuid and setgid programs.
    4. Reconfigure user accounts for only the necessary users.
  g. WebServers
    1. Anonymous Account Permissions (page view only)
    2. Filters
    3. Executable Scripts
  h. Email
    1. ACLs
    2. Router deny/lists
  i. FTP Servers
    1. VPN/SSH in place
    2. Separate logon accounts for ftp
    3. Disable anonymous account
  j. Patch Management
    1. Hotfix—A hotfix is an immediate and urgent patch. In general, these represent serious security issues and are not optional; they must be applied to the system.
    2. Patch—A patch provides some additional functionality or a non-urgent fix. These are sometimes optional. Service pack—
    3. A service pack is the set of hotfixes and patches to date. These should always be applied but test them first to be sure that no problems are caused by the update.
  k. Remote Session Monitoring
  l. EndPoint
    i. AV in place
    ii. AS in place
    iii. Pop up blockers
    iv. Host based firewalls
    v. Host based IDS
7. Vulnerability Detection
  a. Targeted testing is performed by the organization's IT team and the penetration testing team working together. It's sometimes referred to as a "lights turned on" approach because everyone can see the test being carried out.
  b. External testing targets a company's externally visible servers or devices, including domain servers, email servers, web servers or firewalls. The objective is to find out if an outside attacker can get in and how far they can go once they have gained access.
  c. Internal testing performs an inside attack behind the firewall by an authorized user with standard access privileges. This kind of test is useful for estimating how much damage a regular employee could cause.
  d. Blind testing simulates the actions and procedures of a real attacker by severely limiting the information given to the person or team performing the test. Typically, the pen testers are given only the name of the company.
  e. Double-blind testing takes the blind test and carries it a step further only one or two people within the organization might be aware a test is being conducted.
  f. Black box testing is basically the same as blind testing, but the tester receives no information before the test takes place. Rather, the pen testers must find their own way into the system.
  g. White box (Crystal box) testing provides the penetration testers with information about the target network before they start their work. This information can include IP addresses, network infrastructure schematics, the protocols being used and so on.

In an embodiment, one or more features that enable the one or more users to act on risks identified by the system include but are not limited to:
  1. Treasure Hunt
  2. Work on the right thing
  3. Too many choices
  4. Have nothing or have a list too long
  5. Poking around, calling people
  6. Lot of mess
  7. Slow way of operating
  8. What is going up and what is going down, what distributions are changing
  9. Change life of the user The system enables users to create tasks to interact and follow up to a system-detected risk. The tasks may be assigned to self or another user. The tasks may be reassigned to another user as well. Each task has a lifecycle where the task is created, the task is acted upon or dismissed, and the task is then closed. A user may view the created tasks and the assigned tasks. A manager may be allowed or given permission to view the tasks across multiple users. The tasks may be of several types. Some tasks are acted upon through an in-product workflow. Some tasks are acted upon outside the product. Other tasks do not require an action but just an acknowledgement.

User Management Service
  The service that enables user management including:
  1. Adding/Removing/Editing User & User properties
  2. Role based Access
  API
    1. /Users
      a. Add a new User
      b. Delete a User
      c. Get User Details
      d. Edit User Details
    2. /Users/[id]/Role
      a. Get User Role
      b. Assign User Role
  Schema
    1. User
      a. First Name, string, required
      b. Last Name, string, required
      c. Role [Manager|User], enum, required default=user
      d. Status [Active|InActive], enum, required default=Active
      e. UserID, string, required, valid email Task Management Service
  The service that enables task management including:
  1. Adding/Removing/Editing Tasks and Task properties
  2. Task lifecycle management
  API
    1. /Tasks
      a. Add a new task
      b. Delete a task
      c. Get task details
      d. Edit task details 2. GET/Tasks?q=[ALL|my]&dateto=1/1/2020&datefrom=1/2/2020&userid=xxxx
   a. If /Users/[id]/Role=="manager", show all tasks else show only tasks belonging to user
3. POST or PUT /Tasks/[id]
   a. Return/edit task details Schema
1. Task
   a. Task ID, required, guid
   b. Task Name, required, string
   c. Task Description, required, string
   d. Comments [text, date, users], list of string, date, list of userIDs, optional
   e. Status [Open|Closed|In Progress] enum, default=open
   f. Risk ID, required, guid
   g. Created By, required, userID
   h. Created Date, required, date
   i. Task Type [Firewall|URL Filtering|SubNet Creation|SubNet Isolation|Bandwidth|Sandbox|Browser|CloudApps|Data Loss Prevention|FileType Control|Malware|Mobile Security|SSL Inspection|User Training], enum, default=unassigned
   j. Task SubType [Add|Remove|Disable|Disable Permanently], enum, default=unassigned
   k. Task Metadata, required, task specific JSON blob
   l. Assigned To, required, userID [System, user]
   m. Assigned By, required, userID
   n. Last Updated, required, date
   o. Last Updated User, required, userID
   p. Watchers[ ], list of userIDs, required
   q. DueDate, required, date 2. Risk
   a. Risk ID, guid, required
   b. Risk Type, enum, required (DOS|Data Theft|Espionage|Data Sprawl|Compromise|CredentialTheft|Privacy|Ransomware Target) required, default=unassigned
   c. Date Created, required, date
   d. Risk Name, required, name
   e. Risk SubType [Source|Destination|Target|Path], enum, required, default=unassigned
   f. Risk Status [Open|Resolved|Unresolvable|Dismiss|In Progress], enum, required, default=Open
   g. RelatedRisks [riskID, date], required, list Notification Service
The service that enables delivery of notifications including:
1. Notifications delivered through UI and/or email
2. Notifications triggering capability API
1. /notifications
   a. Create a new notification
   b. Delete a notification
   c. Edit details of a notification
   d. Get notifications
2. GET /notifications?q=My
   a. Return all notifications for a given user
3. PUT /notification {user:'userID', "task":"taskID", "DeliveryType":"All"}
4. Notification Cron Job Schema
1. Notification
   a. Notification ID, guid, required
   b. User Notified, userID, required
   c. Date Created, date, required
   d. Task ID, guid, required
   e. DeliveryType ['All', 'Email', 'UI], enum, required, default=ui
   f. DeliveryComplete [True|False], required, bool, default=false Labels Profiles and Risk

| Risk | Indicative Profile Behavior | Indicative Labels |
|---|---|---|
| Denial of Service (DOS) | Unexpected or Recent New heavy traffic | Distinct OS, Distinct User Agent Family, Flooder, Guessor, Robot Abuser, Short Session, Error |
| Data Exfiltration | Unexpected data downloads or recent new data downloads | Content Quota Exceeder, Content Robber, Content Scraper, Static Content Scraper, Storm, Tornado, SQL Activity, File/Data Access, Web Activity, API/Service Query |
| Espionage | Unexpected broad data access or recent new broad data access | Tor List Rule, Bad Protocol, Bad Port, Bad UserAgent, Bad URL, Bad Referrer, Bad IP, Bad Fake Google Bots, Bad Browser, Bad OS, Bad ISP, Bad GeoLoc |
| Data Sprawl | Data used by same business category found in many different sources | Data utility scans and finds data used by same teams spread across multiple source (often redundant, duplicate, or related) |
| Compromise | Recent surge in risky behavior or risky incoming like phish | Change_Local_*, Change_Global_*, TimeSeriesBehavior-Similarity-OutlierCluster, Causal Impact of Interference, Time Based Window Labels*, Connection Based Labels* |
| Credential Theft | Unexpected authentication activity | Brute Guessor, Login Guessor, oAuth Abuser, oAuthCollector, oAuthHarvestor, Login Auth Activity, Excessive Redirects, oauth |
| Privacy Leak | Private information/PII/HR/Customer/Financial found in multiple data source | Privacy utility returns a list of DS with privacy data/exposure and access score. Risk = High Privacy + High Usage |

-continued

| Risk | Indicative Profile Behavior | Indicative Labels |
|---|---|---|
| Identity Credential Sprawl | Identities (service keys, usernames, passwords, tokens) found in multiple data sources Credentials | Cred utility returns a list of DS with guides, usernames, passwords, tokens, service keys etc. and store it |
| Ransomware Target | Datasets that are likely to be compromised/locked/encrypted | Ransomware utility returns list of DS with important info with heavy access |

Risk Aggregation

The various types of risks may include one or more of without limiting the scope of the invention:
1. Network Risk
  a. Show distribution of risks by type (business, service, asset, information) and severity
  b. Show total risks over time
  c. Show change in distribution of risks by type
2. Business Risks
  a. Analyze web activity (web access logs) to determine which department or business unit an IP address belongs to
  b. URL->App->Business Category
  c. IPs of the same businesses are part of same networks, connect to each other mostly and have similar apps running on them and connect to similar web apps
3. Service Risk
  a. Analyze network activity in Syslogs, Firewall log, DB log, Application log to determine services (lots of incoming connections from multiple IPs)
  b. Connecting IP->Service Determination (Domain Keywords)
4. Asset Risk
  a. Analyze Device activity from device log, web access log
  b. IP->Consumer apps+Consumer Service
  c. Assets connect to Services with consumer apps running on them
5. Information Risk
  a. Determine information stores such as web applications (Box, Dropbox, Sharepoint online, Salesforce), online storage (Azure Blog, AWS S3, Google storage, Google drive), on prem databases (Postgres, Oracle, SQL server, mySQL, Mongo, etc.) and on pre file shares
  b. Determine private data, financial data, customer data, HR data
  c. Use PII service and domain keywords Log Extraction, Labeling, and Analysis

| Log Type | Algorithm | Configuration | Output | Metrics |
|---|---|---|---|---|
| Web Access Logs | 1. Use Connecting IP as the profile ID<br>2. Match URI to "API" or "URL"<br>3. If "API" then output Mode=App<br>4. If "URL" then output Mode=URL | Standard Web Access Log format | IP, Business Category, App \| User | Requests Distribution, Audit Events, Availability, Threats by Type, Events by Type |
| Firewall | 1. Use FW log to determine "Client" and "Server" | Standard firewall log access format | IP, Asset \| Service | Auth Permitted, Traffic Dropped, Firewall Start/Stop/Restart, Firewall Configuration Modified, Admin Access Granted, Admin Session |
| Application Log | 1. Connecting IP is the Asset<br>2. Use "Domain_Detector" on Payload to identify Domain and business category<br>3. Use "Request_Detector" to identify Request Type | Standard application log format | IP, Domain, Business Category, Request Type, Asset | Parse:<br>Timestamp (local time plus offset)<br>Log Level (Error, Debug, Warn, Info)<br>Stack Trace<br>Thread Name<br>Message<br>CustomerID<br>IP Address<br>QueryID<br>E.g.<br>"message": "connection refused",<br>"service": "istener",<br>"thread": "125",<br>"customerid": "776622",<br>"IP": "34.124.233.12",<br>"queryid": "45"<br>Then Analyze:<br>Requests Distribution, Audit Events, Availability, Threats, Events, Context in log |

| Log Type | Algorithm | Configuration | Output | Metrics |
|---|---|---|---|---|
| DB Log | 1. Connecting IP is the Asset<br>2. User is the User Account<br>3. (use connecting string)<br>4. Use "Domain_Detector" on payload to determine domain and business category | Standard database log format | IP, Domain, Business Category, Request Type, Asset \| Service | Extract Timestamp, Local offset User Db Statement Keywords (from stmt) Duration Then Analyze Requests Distribution, Audit Events, Availability, Threats, Events |
| Syslog | 1. Any IPs detected in message are the "connecting IP"<br>2. Process Name<br>3. User/Host name | Standard sys log format | IP, Target, Message Type | Extract IP, Application, Process and Message contents |
| DNS Log | 1. Do a reverse DNS on host to get domain | Standard DNS log format | | |

Main algorithm includes steps such as:
Step 1: Identify risky entities due to email/web access/DNS access.
Step 2: Find their connections.
Step 3: Expand Risk using "Contact Tracing".
Step 4: Output as RISK all SaaS, Devices, Cloud, Email, Data, Application, network relations as infected/Risky.
Step 5: output as RISK all policies that allow this IP/entity to do stuff (firewall, app policies etc.).
Step 6: output as timeline, all activity that shows this sequence of activities.
Details
  1. Get Phish Emails.
  2. Get Sender IP and IP of all embedded URLs.
  3. Look for Phish IP, Embedded Domains, Embedded IP URL in Access Logs.
  4. Look for DNS queries to Embedded Domains, Embedded IP URL.
  5. Get IP/profiles that are talking to or querying DNS for "bad IPs" and "bad domains".
  6. Find Data Access from these IPs and look for change.
  7. Find SaaS access from these IPs and look for change.
  8. Find all other access from these IPs and look for change.
  9. Find application log entries of these IPs and look for change.
  10. Find firewall entries for this IP and nominate usual connections as potential RISK.
  11. Fine data sources that this IP talks to and nominate usual connections as potential RISK.
  12. Find typical email recipients of this user/IP and nominate them as potential RISK.
Aware
  Situation in the environment
    Assets
      OS
      Apps
      Processes
      Services
      Data
      How is data flowing from system to system
      Devices connected to network
      Cloud
      Workloads spinup/down
      Iot
    Detect vulnerabilities
      SMB vulnerability
      Outside
  Identify
  Detect
Act
  Analysis
    Automate the analysis
    Junior analyst goes through
    Look at the hash. Is it bad hash? what's the file reputation?
    Code blocks, run through YAR rules, run through sandbox tech
    Alert comes with analysis, take containment action, remediate it
  Automate
    Options to automate response
    Better logs
    Choose security controls
    Enforcement points Zero Trust API for Zero Trust Verification The application server 102 may offer a Zero-Trust API that enables real-time evaluation and verification of any entity (such as a user, a computer, a device, or the like) to determine whether the entity should be allowed to complete the requested action. The API may be configurable to enable various levels of risk tolerance to enable a system administrator to configure the threat level for action for any entity. The input of the API is the unique identifier of the entity and the entity type (such as an Ip address, a device, a machine, a user, or the like). The output of the API is the risk and threat level associated with the entity. The risk may be measured as low, medium, and severe. The threat level may be determined as imminent, context, network and low. In some embodiments, the system administrator may be enabled to create business logic in downstream applications that use the risk and threat levels to enable zero-trust verification.

Zero Trust API

This API has the following signature:

```
/zerotrust?q=[entityid]&r=[riskthreshold]
Where,
Q = Entity ID, if not provided, "All" is assumed, and
R = Risk Threshold, if not provided, "Sensitive" is assumed
The API response is:
Risk
[
  Severe - Risk score of entity is in 4th quartile
  Medium - Risk Score of entity is in 2 or 3 quartile
  Low - Risk score of entity is in 1st quartile
]
Threat
[
  Underway - an attack is currently being carried out
    (Look at last 10 minutes of data or risky profiles that are active
    for new risk)
  Imminent - an attack is highly likely in the near future
    (Look at last 1 day of data or risky profiles timeseries and
    forecast risk level)
  Low - an attack is not likely
    (Look at last 1 day of data or risky profiles timeseries and forecast
    risk level)
  Moderate - an attack is possible but not likely
    (Look at last 7 days of data or risky profiles timeseries and
    forecast risk level)
  Substantial - an attack is likely
    (Look at last 7 days of data or risky profiles timeseries and
    forecast risk level)
  Severe - an attack is highly likely
    (Look at last 7 days of data or risky profiles timeseries and forecast
    risk level)
]
Vector
[
  Context - an attack is likely in a certain context in which the
  entity operates
    (Return the ECs/Apps where risk was noticed)
  Network - an attack is likely in the entity's immediate network
    (Return the neighbor entities that are risky)
  Originator - an attack is likely to originate from this entity
    (Return the ECs/Apps that show attacks originating)
  Target - an attack is likely to hit this entity
    (Return the ECs/Apps that show entity as target of attack
  Temporal - an attack is likely in the current temporal space
    (Return the time set of when the attacks happen)
  Spatial - an attack is likely in the current temporal space
    (Return the location set of when the attacks happen)
]
```

In an embodiment, the API has a configuration "Risk Threshold" that can be measured as sensitive, average, heightened, or normal Cyber Health Control Tower for Business & Network AI Powered Oversight & Health Monitoring The application server 102 may further offer a Cyber Health Control Tower that enables executive users with a single, comprehensive overview of the cyber risk in a business and network. The Cyber Health Control Tower offers an overall business and network health assessment that measures the overall risk and threat level using event labelling. The application server 102 may measure the business and network risk and threat level using the following logic: Total number of events labelled as Not Risky—Total Number of events labelled as Risky In an embodiment, the users may be able to view the business and network threat level over time to view any changes or shifts. In addition, the users may be able to drill down into the business and network threat level to determine a source of risk, a location of risk origination, an imminency of the risk, a context of the risk, and a network depth of the risk.

Ordered Cyber Risks Feed with Predictive Mitigations

The application server 102 may further offer a real-time feed of the detected risks and threats. The application server 102 may further deliver these risks to the user through real time notifications and on-demand queries. The application server 102 may the risk including details such as which entities are involved in the risk, which systems are the origin point of the risk, the sequence of events associated with the risk, and other metadata that enables the user to evaluate and address the risk. The application server 102 may also deliver predictive mitigations to enable the users to swiftly mitigate or configure the automated mitigation of the risk of a certain type.

Although particular embodiments of the invention have been described in detail for purposes of illustration, various modifications and enhancements may be made without departing from the spirit and scope of the invention.

What is claimed is:

1. A system, comprising:
   a memory and a processor; and
   circuitry configured to:
   collect data from several data sources and generate events;
   label the events in all logs with event labels;
   create uniquely identified IDs for all entities observed in a network across the logs available;
   create a profile for each ID;
   label transference from the events to the entities through temporal and spatial label aggregation;
   extend the profile through generation of new behaviors that leverage raw data logs or existing profile attributes;
   identify one or more profiles of an organization that have changed or exhibited suspicious, malicious, or unexpected behavior to identify one or more risks associated with each profile;
   notify one or more users associated with the one or more profiles based on the one or more risks;
   generate and deliver predictive mitigations to mitigate the one or more risks with recommendations organized for easy implementation due to customization to the sources providing the raw data;
   generate and deliver protected and unprotected scenario simulation results to demonstrate impact of the predictive mitigations or impact of not acting on the predictive mitigations;
   offer a network monitoring and network health improvement system that enables the users with a single, comprehensive overview of the one or more risks in a business and the network sorted by severity of business impact and severity of impact coverage along with the predicted effective mitigation recommendations and automated, proactive execution;
   generate and deliver, sorted by severity, predicted network risks by analyzing ability of security analysts to effectively mitigate the previously predicted risks throuqh proactive action;
   generate and deliver, sorted by severity, predicted network risks by analyzing mitigative actions of security analysts and measurement of effectiveness of those actions;
   generate and deliver newly detected risks as a risk feed to the security analysts as a part of ordered risks real time feed;
   generate and deliver an aggregated, clustered, and categorized view of the risks over similarities;
   enable programmatic, proactive notifications, and on-demand queries through an application programming interface (API) to be leveraged to make real-time zero trust decisions for downstream applications that determine whether to allow user and system access to data, metadata, and services depending on a risk associated with a requesting entity and a risk generated after enabling the access;

perform an automated search throuqh all the qenerated risks and determine clusters of entities with highest risks and identify key drivers of risks for each of the clusters along with most influential key metrics associated with each of the clusters and the key drivers of risks; and generate and deliver the most severe risky clusters along with their top drivers of risks and key influencing metrics for each of the drivers through proactive notifications to targeted security analysts and network security teams.

2. The system of claim 1, wherein the data sources include network logs, access logs, API logs, device logs, service logs, cloud logs, SaaS logs, and security product alarms.

3. The system of claim 1, wherein the profiles have multiple aspects with each aspect covering a certain aspect of behavior of the profile.

4. The system of claim 3, wherein the behavior of the profile includes behavior as a timeseries series of labels generated on logs containing the profile, behavior as a source of risk, behavior as a target of risk, relationships with other entities both inside and outside the network, and relationships including the direction of the relationships.

5. The system of claim 1, wherein the profiles are assigned labels if the profile entity is found to be interacting in an event and the event has been assigned a label.

6. The system of claim 1, wherein the circuitry is further configured to generate the profile where the logs are stored.

7. The system of claim 1, wherein the profile is regenerated on newly arrived data or updated existing data.

8. The system of claim 1, wherein the circuitry is further configured to detect changes in sequence of operations for the profile as another signal of suspicion sequence and correlation of different types of activity/labels.

9. The system of claim 1, wherein the detection helps to reduce false alarms, review entitlements, and review usage.

10. The system of claim 9, wherein the detection useful to perform market basket analysis for segmenting or grouping of entities to understand entitlements, usage and expected behavior.

11. The system of claim 1, wherein the circuitry is further configured to facilitate a user management service that enables a user to add, remove, or edit user properties of the user.

12. The system of claim 1, wherein the circuitry is further configured to facilitate a user management service that enables a user to add, remove, or edit task and task properties.

13. The system of claim 1, wherein the circuitry is further configured to facilitate a notification service having a notification triggering capability to notify the one or more users, wherein the one or more notifications are delivered through an email.

14. The system of claim 1, wherein the circuitry is further configured to analyze the one or more profiles to identify the one or more risks and calculate a risk score for each risk periodically.

15. The system of claim 1, wherein the circuitry is further configured to predict the one or more risks such as network risk, assets at risk, services at risk, information risk, businesses at risk and departments at risk using Cohorts analysis, Profile Behavior, and Risk computation.

16. The system of claim 15, wherein the network risk shows distribution of the risks by type and severity, wherein the network risk shows the total risks over time, and wherein the network risk shows change in distribution of the risks by type.

17. The system of claim 15, wherein the business risk includes analyzing web activity to determine which department or business unit an IP address belongs to.

18. The system of claim 15, wherein the asset risk includes analyzing device activity from device logs and web access logs and accordingly assets connect to services with consumer applications running on them.

19. The system of claim 15, wherein the service risk includes analyzing the network activity in Syslogs, Firewall log, DB log, Application log to determine services at risks.

20. The system of claim 15, wherein the information risk includes determining information stores such as web applications, online storage, and databases, and determine private data, financial data, customer data, and HR data to identify the associated information risks.

* * * * *